US012786556B2

(12) United States Patent
Takagi

(10) Patent No.: US 12,786,556 B2
(45) Date of Patent: Nov. 3, 2026

(54) ELECTRONIC APPARATUS CAPABLE OF SUPPRESSING UNNECESSARY INCREASE IN SIZE OF DIGITAL FILE WHOSE AUTHENTICITY IS CAPABLE OF BEING CERTIFIED EVEN IF DATA IS CHANGED AFTER GENERATION, CONTROL METHOD FOR ELECTRONIC APPARATUS, AND STORAGE MEDIUM

(71) Applicant: CANON KABUSHIKI KAISHA, Tokyo (JP)

(72) Inventor: Yosuke Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/223,187

(22) Filed: May 30, 2025

(65) Prior Publication Data

US 2026/0006316 A1 Jan. 1, 2026

(30) Foreign Application Priority Data

Jun. 27, 2024 (JP) ................................ 2024-103936

(51) Int. Cl.
*H04N 23/60* (2023.01)
*H04N 23/63* (2023.01)
*H04N 23/667* (2023.01)

(52) U.S. Cl.
CPC ........... *H04N 23/64* (2023.01); *H04N 23/631* (2023.01); *H04N 23/667* (2023.01)

(58) Field of Classification Search
CPC ..... G06F 21/64; H04L 9/3247; H04N 23/631; H04N 23/64; H04N 23/667
See application file for complete search history.

(56) References Cited

U.S. PATENT DOCUMENTS 11,064,117 B2 7/2021 Arifuku
11,323,260 B2 * 5/2022 Wang .................... H04L 9/0894
(Continued)

FOREIGN PATENT DOCUMENTS

JP 2020167624 A 10/2020
KR 20210121805 A * 10/2021 .............. H04L 9/50

OTHER PUBLICATIONS

Coalition for Content Provenance and Authenticity, "C2PA Technical Specification," 1.0, Dec. 21, 2021.
(Continued)

*Primary Examiner* — Amy R Hsu
(74) *Attorney, Agent, or Firm* — Venable LLP

(57) ABSTRACT

An electronic apparatus is capable of suppressing an unnecessary increase in a size of a digital file whose authenticity is capable of being certified even if data is changed after generation. A digital camera that has an authenticity certification photographing mode, in which an image file whose authenticity is capable of being certified is generated, includes a system control unit. In a case where the digital camera has been set to the authenticity certification photographing mode and a plan has been set in which data appending is performed with respect to an XMP area, which has been excluded from a subject of authenticity certification, from among areas constituting the image file after the image file is generated, the system control unit enlarges a size of the XMP area to a size larger than when the digital camera has been set to a normal photographing mode and generates the image file.

19 Claims, 10 Drawing Sheets

(56) References Cited

U.S. PATENT DOCUMENTS

| | | | | |
|---|---|---|---|---|
| 2011/0193975 | A1* | 8/2011 | Hayashi | H04N 1/32128 707/E17.031 |
| 2015/0261996 | A1* | 9/2015 | Kim | H04N 23/62 348/14.03 |
| 2017/0230179 | A1* | 8/2017 | Mannan | H04L 9/3226 |
| 2020/0314336 | A1 | 10/2020 | Arifuku | |

OTHER PUBLICATIONS

Extended European Search Report dated Oct. 6, 2025 in counterpart European Patent Appln. No. 25179795.7.

* cited by examiner

ELECTRONIC APPARATUS CAPABLE OF SUPPRESSING UNNECESSARY INCREASE IN SIZE OF DIGITAL FILE WHOSE AUTHENTICITY IS CAPABLE OF BEING CERTIFIED EVEN IF DATA IS CHANGED AFTER GENERATION, CONTROL METHOD FOR ELECTRONIC APPARATUS, AND STORAGE MEDIUM

BACKGROUND OF THE INVENTION

Field of the Invention

The present invention relates to an electronic apparatus, a control method for the electronic apparatus, and a storage medium.

Description of the Related Art

In recent years, information sharing via the Internet and social networking services (SNS) has become more common, allowing anyone to view and transmit information. On the other hand, advances in digital image processing technology have made it more difficult for viewers of information to verify the authenticity of the contents they are viewing, and problems such as fake news are becoming more serious. For this reason, there is an increasing demand for a mechanism to certify that a digital image has not been altered or falsified (tampered with), that is, to certify the authenticity of the digital image. As such a mechanism, for example, a technique has been known in which a part of an image file (a part of an area within an image file) is hashed to obtain a hash value, the hash value is encrypted by using an individual encryption key to generate a digital signature, and the digital signature is then attached to the image file. This makes it possible to certify that the part of the image file (the part of the area within the image file) has not been altered or falsified (tampered with), that is, to certify the authenticity of the image file. In addition, recently, an image pickup apparatus equipped with an authenticity certification photographing mode that enables photographing using the above-described technique has also appeared. It should be noted that in the following description, "after photographing" refers to after an image file has been generated by photographing.

Incidentally, in the above-described technique, since the authenticity of the image file is certified via the hash value, in the case where an area where changing data is permitted after photographing is provided within the image file, one possible solution to this case is to prevent the area where changing data is permitted after photographing from being hashed. However, in the case where changing data after photographing is not a data replacement but a data append, the position of the area to be hashed may be shifted by appending data to the area that is not to be hashed. Furthermore, in this way, when the position of the area to be hashed is shifted, the digital image may be erroneously determined to have been altered or falsified (tampered with).

Therefore, in the case where an area where appending data is permitted after photographing is provided within an image file, one possible solution to the above-described erroneous determination is to reserve a blank area where data is to be appended after photographing when generating the image file. An example of a related technique is an image pickup apparatus that has been disclosed in Japanese Laid-Open Patent Publication (kokai) No. 2020-167624. The image pickup apparatus that has been disclosed in Japanese Laid-Open Patent Publication (kokai) No. 2020-167624 reserves, in a header area of an image file, a blank area where data is to be appended after photographing, depending on a photographing mode. In other words, the image pickup apparatus that has been disclosed in Japanese Laid-Open Patent Publication (kokai) No. 2020-167624, in the case where the photographing mode has been set to a predetermined mode, when generating an image file by photographing in the predetermined mode, reserves a blank area within the image file.

However, even if the photographing mode has been set to the predetermined mode, after photographing, appending data is not necessarily performed with respect to the blank area of the image file that has been generated by photographing in the predetermined mode. Therefore, even if a blank area has been reserved in response to that the photographing mode has been set to the predetermined mode, if appending data after photographing is not performed with respect to the blank area, there is an issue that the size of the image file becomes unnecessarily large by the size of the blank area.

SUMMARY OF THE INVENTION

The present invention provides an electronic apparatus capable of suppressing an unnecessary increase in a size of a digital file whose authenticity is capable of being certified even if data is changed after generation, a control method for the electronic apparatus, and a storage medium.

Accordingly, the present invention provides an electronic apparatus that has a predetermined mode in which a digital file whose authenticity is capable of being certified is generated, the electronic apparatus comprising at least one processor, and a memory coupled to the processor storing instructions that, when executed by the processor, cause the processor to function as a first determining unit that determines whether or not the electronic apparatus has been set to the predetermined mode, a second determining unit that determines whether or not a plan, in which data appending is performed with respect to a predetermined area, which has been excluded from a subject of authenticity certification, from among areas constituting the digital file after the digital file is generated, has been set, and a generating unit that, in a case where the electronic apparatus has been set to the predetermined mode and the plan, in which data appending is performed with respect to the predetermined area after the digital file is generated, has been set, enlarges a size of the predetermined area to a size larger than when the electronic apparatus has been set to a mode different from the predetermined mode and generates the digital file.

According to the present invention, it is possible to suppress the unnecessary increase in the size of the digital file whose authenticity is capable of being certified even if the data is changed after generation.

Further features of the present invention will become apparent from the following description of exemplary embodiments with reference to the attached drawings.

BRIEF DESCRIPTION OF THE DRAWINGS

FIGS. 3A, 3B, and 3C are diagrams that show an internal structure of an image file, and the like.

DESCRIPTION OF THE EMBODIMENTS

Figure 1A:
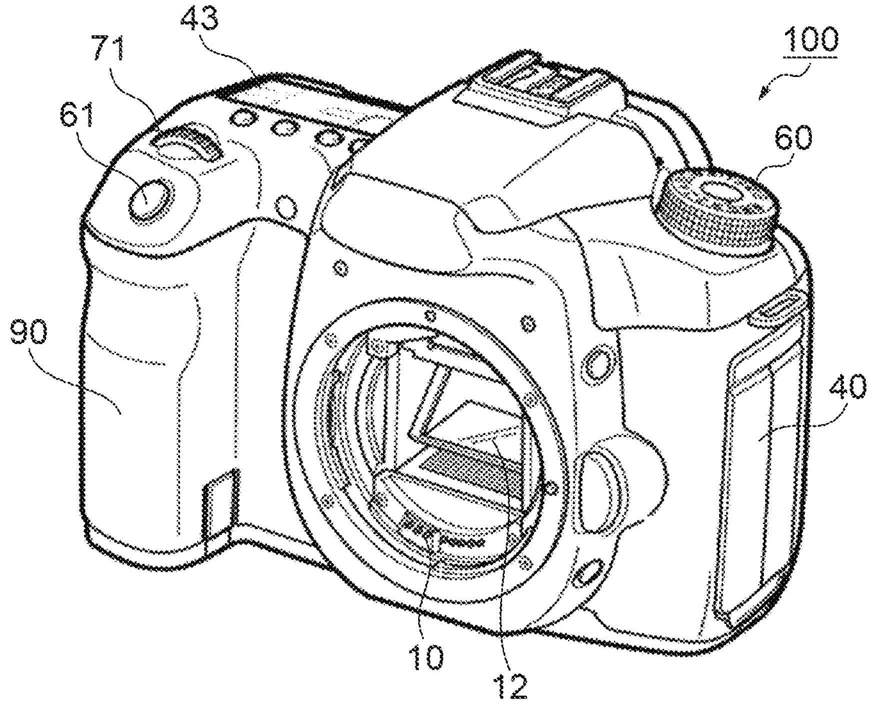
FIG. 1A and FIG. 1B are views that show an external appearance of a digital camera.

The present invention will now be described in detail below with reference to the accompanying drawings showing embodiments thereof.

Hereinafter, a preferred embodiment of the present invention will be described in detail with reference to the accompanying drawings. However, the configuration described in the present embodiment is merely an example of means for realizing the present invention, and the scope of the present invention is not limited by the configuration described in the present embodiment. For example, each unit (each part) constituting the present invention can be replaced with a unit (a part) having an arbitrary configuration capable of exhibiting a similar function. In addition, arbitrary component(s) may be added. Furthermore, any two or more configurations (features) of the present embodiment may be combined. In addition, the present embodiment may be modified or changed as appropriate depending on the configuration of an apparatus to which the present invention is applied and various conditions. It should be noted that in each drawing, the same components are denoted by the same reference numerals, and the description thereof may be omitted. In addition, in the present embodiment, a digital camera will be taken as an example of an electronic apparatus according to the present invention and will be described below.

Figure 1B:
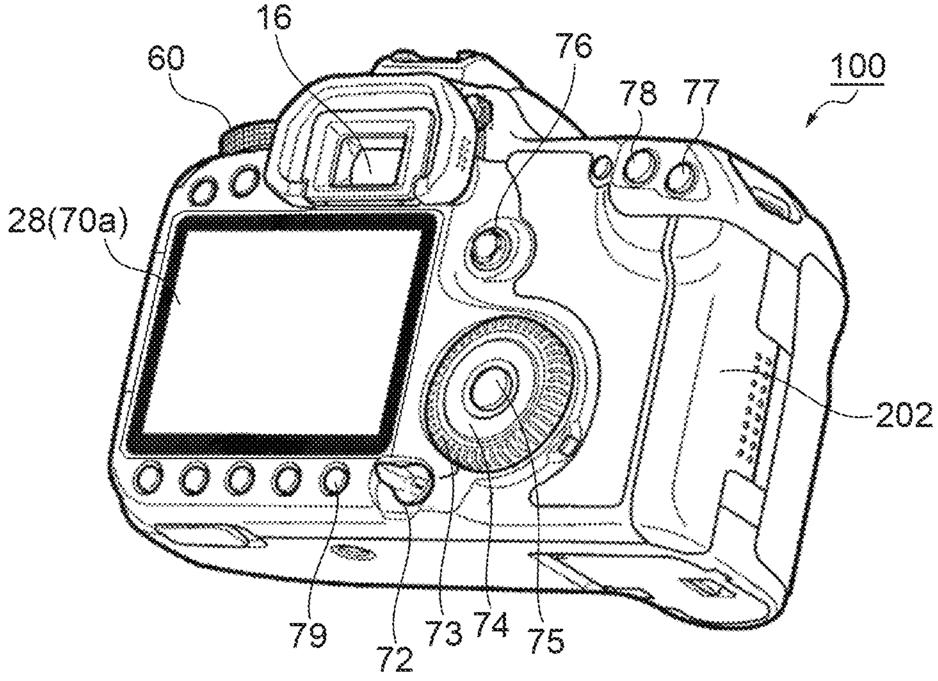

FIG. 1A and FIG. 1B are views that show an external appearance of a digital camera 100. FIG. 1A is a front perspective view of the digital camera 100, and FIG. 1B is a rear perspective view of the digital camera 100. A display unit 28 is a display unit provided on the rear surface of the digital camera 100, and displays images and various types of information. A touch panel 70*a* is able to detect a touch operation on a display surface (a touch operation surface) of the display unit 28. An extra-finder display unit 43 is a display unit provided on the top surface of the digital camera 100, and it displays various kinds of setting values of the digital camera 100, including a shutter speed and an aperture. A shutter button 61 is a button for issuing a photographing instruction. A mode change-over switch 60 is a switch for switching between various kinds of modes.

A terminal cover 40 is a cover that protects a connector (not shown) into which a connection cable or the like for connecting an external device to the digital camera 100 is inserted. A main electronic dial 71 is a rotary operation member, and by rotating the main electronic dial 71, the change or the like of the setting values such as the shutter speed and the aperture is capable of being performed. A power switch 72 is a switch for switching the power of the digital camera 100 between ON and OFF (for switching turning on/turning off the power of the digital camera 100). A sub electronic dial 73 is a rotary operation member, and by rotating the sub electronic dial 73, it is possible to perform moving a selection frame, image forward, etc. A cross key 74 is a cross key (a four-direction key) whose upper, lower, left, and right portions are capable of being pressed down, respectively, and is an operation member that is capable of performing a process according to which portion of the cross key 74 is pressed.

A SET button 75 is a push button and is an operation member that is mainly used for deciding a selected item. An LV button 76 is an operation member for switching a live view (hereinafter, referred to as "an LV") in a menu button between ON and OFF. The LV button 76 is used to instruct starting and stopping of moving image photographing (moving image recording) in a moving image photographing mode. An enlargement button 77 is an operation member for, in a live view display of a photographing mode, performing a switch between turning on an enlargement mode and turning off the enlargement mode, and for performing the change of an enlargement rate during the enlargement mode. The enlargement button 77 also functions as an enlargement button for, in a playback mode, enlarging a playback image or increasing an enlargement rate of the playback image. A reduction button 78 is an operation member for decreasing the enlargement rate of the enlarged playback image or for reducing the size of a displayed image. A playback button 79 is an operation member for switching between the photographing mode and the playback mode. By pressing down the playback button 79 during the photographing mode, switching from the photographing mode to the playback mode, and it is possible to cause the display unit 28 to display the latest image among images that have been recorded on a recording medium that is denoted by a reference numeral 200 in FIG. 2 described below.

A quick return mirror 12 is raised and lowered by an actuator (not shown) in response to an instruction from a system control unit, which is denoted by a reference numeral 50 in FIG. 2 described below, during exposure or the like. A communication terminal 10 is a communication terminal through which the digital camera 100 communicates with a lens unit that is denoted by a reference numeral 150 in FIG. 2 described below and that is capable of being attached to and detached from the digital camera 100. An eyepiece finder 16 is a look-in type finder for performing the confirmation of a focus of an optical image of a subject obtained through the lens unit 150 and the composition by observing a focusing screen that is denoted by a reference numeral 13 in FIG. 2 described below. A lid 202 is a lid of a slot for housing the recording medium 200. A gripping portion 90 is a holding portion formed in a shape that allows a user to easily grip the digital camera 100 with his or her right hand when holding the digital camera 100.

Figure 2:
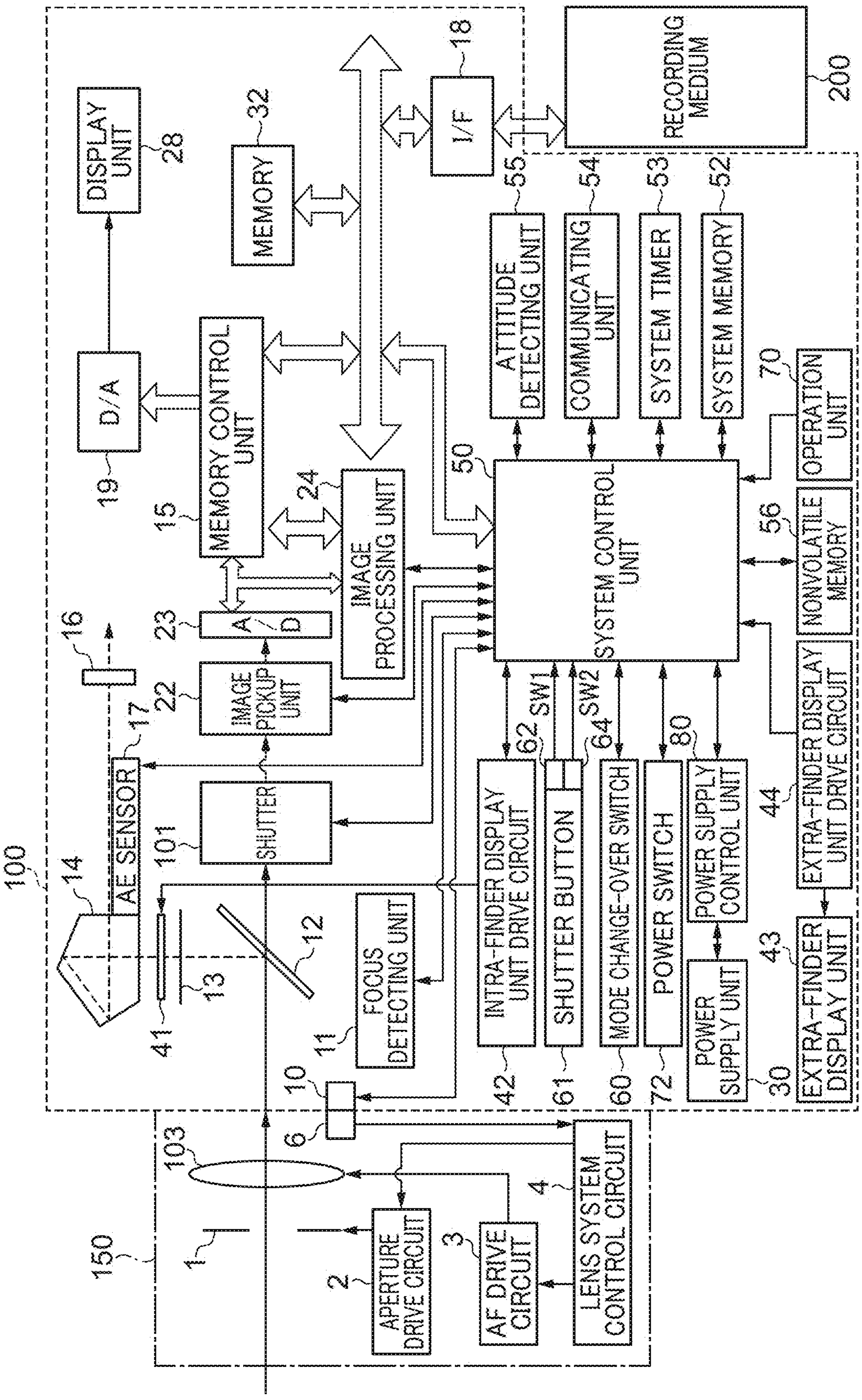
FIG. 2 is a block diagram that shows an example of a configuration of the digital camera.

FIG. 2 is a block diagram that shows an example of a configuration of the digital camera 100. The lens unit 150 is a lens unit equipped with an interchangeable photographing lens. A lens 103 is normally configured by a plurality of lenses, but in FIG. 2, only one lens is shown for simplicity. A communication terminal 6 is a communication terminal through which the lens unit 150 communicates with the digital camera 100, and the communication terminal 10 is a communication terminal through which the digital camera 100 communicates with the lens unit 150. The lens unit 150 communicates with the system control unit 50 via the communication terminal 6 and the communication terminal 10. As a result, in the lens unit 150, a lens system control circuit 4 therein performs the control of an aperture 1 via an aperture drive circuit 2, and it performs focusing by displacing the position of the lens 103 via an AF drive circuit 3.

An AE sensor 17 measures the luminance of the subject through the lens unit 150. A focus detecting unit 11 outputs defocus amount information to the system control unit 50. The system control unit 50 controls the lens unit 150 based on the defocus amount information to perform phase difference AF. The quick return mirror 12 (hereinafter, referred to as "a mirror 12") is raised and lowered by the actuator (not shown) in response to an instruction from the system control unit 50 during exposure, live view photographing, or moving image photographing. The mirror 12 is a mirror for switching a light flux incident from the lens 103 between the eyepiece finder 16 side and an image pickup unit 22 side. The mirror 12 is disposed so as to, normally, reflect the light flux and guide the light flux to the eyepiece finder 16. The mirror 12 is a half mirror that allows a part of the light flux to pass through its central portion, and it transmits the part of the light flux so that it is incident on the focus detecting unit 11 that performs focus detection. In addition, in the case where photographing is performed or in the case where the live view display is performed, the mirror 12 flips up upward and retreats from the light flux so as to guide the light flux to the image pickup unit 22 (mirror up).

By observing the focusing screen 13 through a pentaprism 14 and the eyepiece finder 16, the user is able to confirm the focus of the optical image of the subject obtained through the lens unit 150 and the composition. A shutter 101 is a focal plane shutter that is capable of freely controlling an exposure time of the image pickup unit 22 under the control of the system control unit 50. The image pickup unit 22 is an image pickup device (an image sensor) configured with a CCD solid-state image pickup device or a CMOS solid-state image pickup device that converts the optical image into electrical signals. An A/D converter 23 converts analog signals output from the image pickup unit 22 into digital signals.

An image processing unit 24 performs prescribed processing (for example, a pixel interpolation processing, a resizing processing such as a reducing processing, a color conversion processing, etc.) with respect to data from the A/D converter 23 or data from a memory control unit 15. In addition, the image processing unit 24 performs a prescribed calculating processing by using picked-up image data. The system control unit 50 performs exposure control and ranging control (range-finding control) based on a calculation result obtained by the image processing unit 24. As a result, an autofocus processing (an AF processing), an auto exposure processing (an AE processing), and a preliminary light emission before flash processing (an EF processing) in a through the lens system (a TTL system) are performed. Furthermore, the image processing unit 24 performs a prescribed calculating processing by using the picked-up image data, and it performs an automatic white balance processing (an AWB processing) in the TTL system based on the obtained calculation result.

Output data from the A/D converter 23 is written into a memory 32 via the image processing unit 24 and the memory control unit 15. Alternatively, the output data from the A/D converter 23 is written into the memory 32 via the memory control unit 15 without passing through the image processing unit 24. Image data obtained by the image pickup unit 22 and converted into digital data by the A/D converter 23 is written into the memory 32. The memory 32 has a capacity sufficient to record a predetermined number of still images, a predetermined time period of moving images, and audio. In addition, the memory 32 also functions as a memory for image display (a video image memory). A D/A converter 19 converts, into analog signals, the data for image display that has been written into the memory 32 and supplies it to the display unit 28. In this way, the data for image display that has been written into the memory 32 is displayed on the display unit 28 via the D/A converter 19.

The display unit 28 perform a display according to the analog signals from the D/A converter 19 on a display such as a liquid crystal display (an LCD) or an organic EL display. The memory control unit 15 analog-converts the digital signals, which have been A/D-converted once by the A/D converter 23 and have been accumulated in the memory 32, in the D/A converter 19, and sequentially transfers them to the display unit 28 and then displays them on the display unit 28, thereby enabling a through image display (the live view display). As a result, the display unit 28 functions as an electronic viewfinder. Hereinafter, an image displayed in the live view display is referred to as an LV image. Under the control of the system control unit 50, an intra-finder liquid crystal display unit 41 displays, via an intra-finder display unit drive circuit 42, a frame (an AF frame) indicating a range-finding point for which autofocus is currently being performed, icons indicating the setting status of the digital camera 100, and the like. The various kinds of setting values of the digital camera 100, which include the shutter speed and the aperture, are displayed on the extra-finder display unit 43 via an extra-finder display unit drive circuit 44.

A nonvolatile memory 56 is an electrically erasable and recordable memory, and for example, is an electrically erasable programmable read-only memory (an EEPROM) or the like. The nonvolatile memory 56 records (stores) constants, a program, etc., which are necessary for the operations of the system control unit 50. The program refers to a program for executing a flowchart that will be described below. The system control unit 50 is a control unit that is configured by at least one processor and/or at least one circuit, and it controls the entire digital camera 100. The system control unit 50 executes the program that has been recorded (stored) in the nonvolatile memory 56 to realize respective processes that will be described below. A system memory 52 is, for example, a random access memory (a RAM). The system control unit 50 loads the constants and variables for the operations of the system control unit 50, the program that has been read out from the nonvolatile memory 56, and the like into the system memory 52. In addition, the system control unit 50 also performs display control by controlling the memory 32, the D/A converter 19, the display unit 28, etc. A system timer 53 is a time-measuring unit for measuring a time used in various kinds of controls and measuring a time of a built-in clock.

The mode change-over switch 60, a first shutter switch 62, a second shutter switch 64, and an operation unit 70 are operation means inputting various kinds of operation instructions into the system control unit 50. The mode change-over switch 60 switches the operation mode of the system control unit 50 to one of a still image recording mode, the moving image photographing mode, the playback mode, and the like. As modes included in the still image recording mode, for example, there are an automatic photographing mode, an automatic scene determination mode, a manual mode, an aperture priority mode (an Av mode), a shutter speed priority mode (a Tv mode), and a program AE mode. In addition, there are various scene modes that become photographing settings for different photographing scenes, various custom modes, an authenticity certification photographing mode that will be described below, and the like. By using the mode change-over switch 60, the user is able to directly switch to any one mode of these modes. Alternatively, the user may first use the mode change-over switch 60 to switch to a list screen of the photographing modes, and then use another operation member to selectively switch to one of a plurality of modes displayed. Similarly, the moving image photographing mode may include a plurality of modes.

The shutter button 61 includes the first shutter switch 62 and the second shutter switch 64. The first shutter switch 62 is turned on in the middle of an operation of the shutter button 61 by a so-called half-pressing (that is, a photographing preparation instruction) and causes to generate a first shutter switch signal SW1. Upon receiving the first shutter switch signal SW1, the system control unit 50 starts photographing preparation operations such as the AF processing, the AE processing, the AWB processing, the EF processing, etc. The second shutter switch 64 is turned on when the operation of the shutter button 61 is completed by a so-called full-pressing (that is, the photographing instruction) and causes generation of a second shutter switch signal SW2. Upon receiving the second shutter switch signal SW2, the system control unit 50 starts operations of a series of photographing processing from reading out signals from the image pickup unit 22 to recording the picked-up image as an image file in the recording medium 200.

Individual operation members of the operation unit 70 are assigned to appropriate functions for different situations by, for example, the user selecting and operating various kinds of function icons displayed on the display unit 28, and act as various kind of function buttons. The function buttons include, for example, an end button, a back button, an image forward button, a jump button, a narrowing down button, and an attribute change button. For example, when the menu button is pressed, a menu screen, on which various kinds of settings are capable of being performed, is displayed on the display unit 28. The user is able to intuitively perform various kinds of settings by using the menu screen displayed on the display unit 28, the cross key 74 (the four-direction key with up, down, left and right directions), and the SET button 75. The operation unit 70 is a variety of operation members serving as an input unit that accepts operations from the user. The operation unit 70 includes push buttons, rotary dials, a touch sensor, and the like. The operation unit 70 includes at least the touch panel 70*a*, the main electronic dial 71, the sub electronic dial 73, the cross key 74, the SET button 75, the LV button 76, the enlargement button 77, the reduction button 78, and the playback button 79.

A power supply control unit 80 includes a battery detection circuit (not shown), a DC-DC converter (not shown), a switching circuit (not shown) for switching between blocks to be energized, etc., and performs the detection of whether or not a battery has been attached, a type of the battery, and a remaining battery level. In addition, the power supply control unit 80 controls the DC-DC converter based on results of the detection and an instruction from the system control unit 50, and it supplies necessary voltages to respective units including the recording medium 200 for necessary periods of time. A power supply unit 30 is configured by, for example, a primary battery such as an alkaline battery or a lithium battery, a secondary battery such as a NiCd battery, a NiMH battery, or a lithium-ion battery, or an AC adapter. A recording medium I/F 18 is an interface with the recording medium 200 that is a memory card, a hard disk, or the like. The recording medium 200 is a recording medium such as a memory card for recording images picked up by the image pickup unit 22, and is, for example, a semiconductor memory, a magnetic disk, or the like.

A communicating unit 54 transmits and receives video image signals and audio signals to and from an external device that is connected wirelessly or via a wired cable. The communicating unit 54 is also capable of being connected to a wireless local area network (a wireless LAN) or the Internet. In addition, the communicating unit 54 is capable of communicating with an external device via Bluetooth (registered trademark) or Bluetooth Low Energy. The communicating unit 54 is capable of transmitting the images picked up by the image pickup unit 22 (including the LV image) and the images recorded on the recording medium 200, and it is capable of receiving images and other various types of information from the external device.

An attitude detecting unit 55 detects an attitude of the digital camera 100 with respect to a direction of gravitational force. Based on the attitude that has been detected by the attitude detecting unit 55, the system control unit 50 is able to determine whether the image picked up by the image pickup unit 22 is an image photographed while holding the digital camera 100 horizontally or an image photographed while holding the digital camera 100 vertically. The system control unit 50 is capable of adding orientation information corresponding to the attitude that has been detected by the attitude detecting unit 55 to the image file that has been generated when picking up is performed by the image pickup unit 22, or it is capable of rotating and recording the image. An acceleration sensor, a gyro sensor, or the like is capable of being used as the attitude detecting unit 55. The system control unit 50 is also able to detect the movement of the digital camera 100 (panning, tilting, lifting, whether or not it is stationary, etc.) by using the acceleration sensor or the gyro sensor that is the attitude detecting unit 55.

Figure 3A:
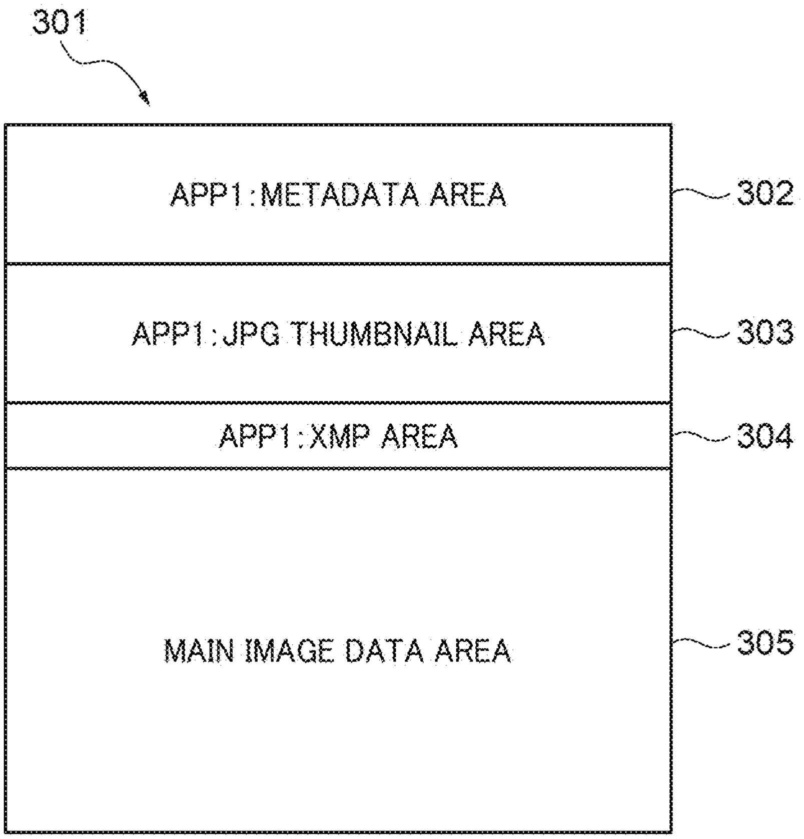
Figure 3B:
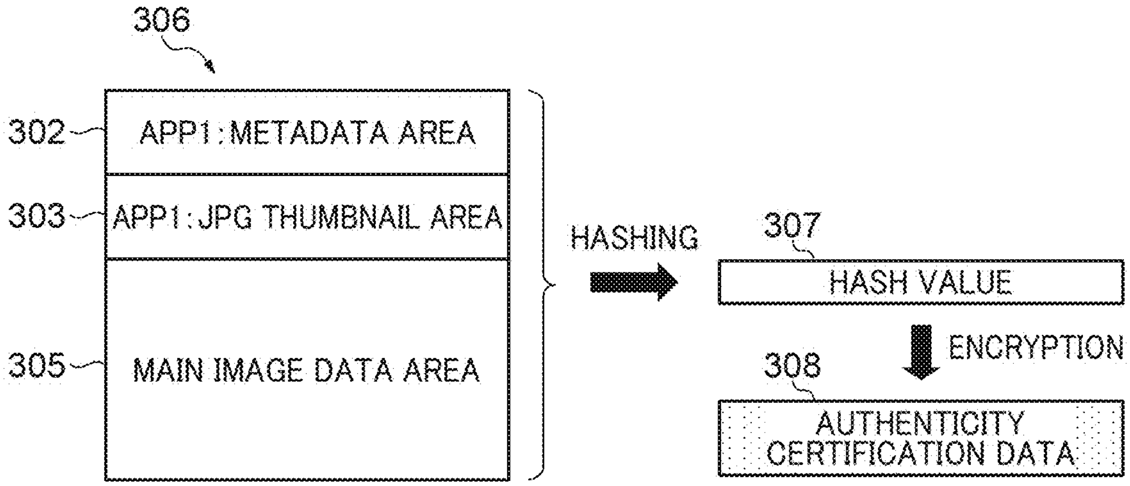
Figure 3C:
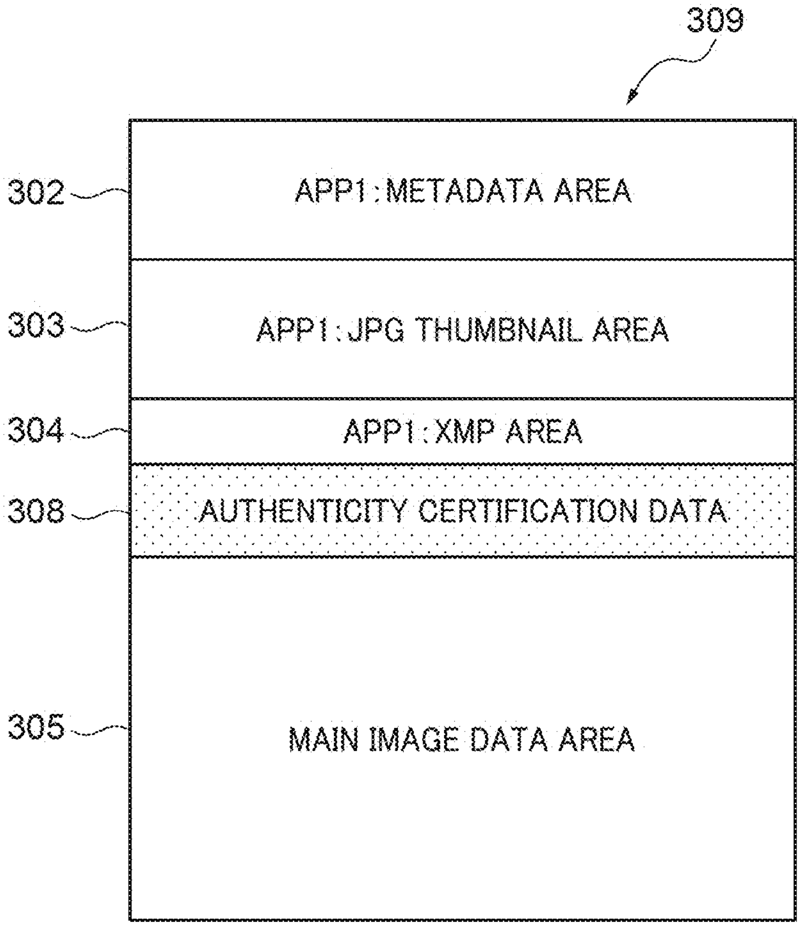

Next, a process of generating an image file (a digital file) generated by photographing in the authenticity certification photographing mode (a predetermined mode), a mechanism of certifying the authenticity, etc. will be described with reference to FIGS. 3A to 5. FIGS. 3A, 3B, and 3C are diagrams that show an internal structure of the image file, and the like. It should be noted that in the present embodiment, an image file in EXIF format is generated, but the format of the image file is not limited to exchangeable image file format (EXIF format), and an image file in another format may be generated. FIG. 3A is a diagram that shows an internal structure of an image file generated by photographing in a normal photographing mode. A reference numeral 301 denotes an image file generated by photographing in the normal photographing mode. A reference numeral 302 denotes a metadata area. The metadata area 302 stores parameters such as setting values at the time of photographing, which are information that is processed and exchanged between various kinds of application software.

A reference numeral 303 denotes a JPG thumbnail area. The JPG thumbnail area 303 stores thumbnail image data for display, which is a reduced version of a main image. A reference numeral 304 denotes an XMP area. The XMP area 304 is an area provided for storing data separately from the metadata area 302. The XMP area 304 stores information, which is not stored in the metadata area 302 and is processed and exchanged between various kinds of application software. A reference numeral 305 denotes a main image data area. The main image data area 305 stores main image data that has been obtained by photographing.

FIG. 3B is a diagram that shows the process of generating an image file generated by photographing in the authenticity certification photographing mode. FIG. 3C is a diagram that shows an internal structure of the image file generated by photographing in the authenticity certification photographing mode. In FIG. 3B, a reference numeral 306 denotes an area combination (hereinafter, referred to as "an authenticity certification subject area combination") in which areas that are a subject of authenticity certification (hereinafter, referred to as "authenticity certification subject areas") have been extracted from the image file 301, respectively, and combined. In the digital camera 100, a plurality of authenticity certification subject areas from among areas constituting the image file 301 are predetermined, and a head address and a size of each of the predetermined authenticity certification subject areas are recorded in the image file 301. As a result, the system control unit 50 is able to extract all the authenticity certification subject areas from the image file 301 and specify the authenticity certification subject area combination 306.

It should be noted that in the present embodiment, it is assumed that data in the XMP area 304 is allowed to be changed (changing data in the XMP area 304 is permitted) after photographing in the authenticity certification photographing mode. Therefore, the XMP area 304 is an area that has been excluded from the subject of authenticity certification (a predetermined area). For this reason, the XMP area 304 does not exist in the authenticity certification subject area combination 306. It should be noted that changing data in the XMP area 304, which has been described above, is realized by a central processing unit (a CPU) of a personal computer (hereinafter, referred to as "a PC") or the like executing application software or the like.

The system control unit 50 hashes the entire authenticity certification subject area combination 306 to obtain a hash value 307. The system control unit 50 further encrypts the hash value 307 by using a prescribed encryption means to generate a digital signature, and inserts authenticity certification data 308, to which the generated digital signature has been imparted, at a predetermined position in the image file 301. As a result, by photographing in the authenticity certification photographing mode, an image file 309, which is shown in FIG. 3C, is generated. It should be noted that the predetermined position is a position of an area suitable for storing the format of the authenticity certification data 308 in the image file 309, and it is determined in advance.

Figure 4:
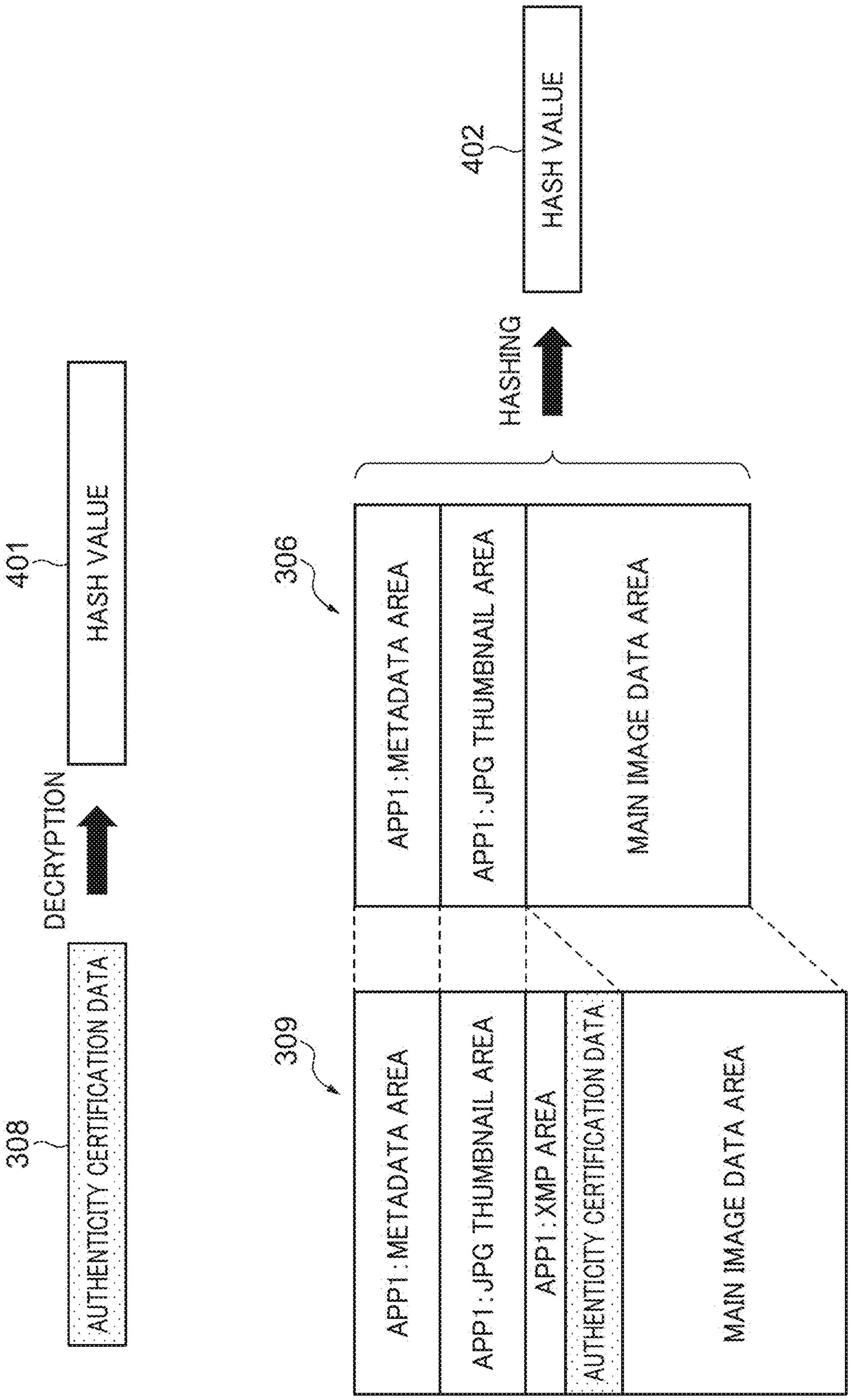
FIG. 4 is a diagram that shows a procedure for certifying the authenticity of an image file that has been generated by photographing in an authenticity certification photographing mode.

FIG. 4 is a diagram that shows a procedure for certifying the authenticity of the image file 309 that has been generated by photographing in the authenticity certification photographing mode. It should be noted that in the following description, it is assumed that the procedure for certifying the authenticity of the image file 309 shown in FIG. 4 is realized by the CPU of the PC or the like executing application software or the like. The CPU extracts the authenticity certification data 308 from the image file 309, and further decrypts the digital signature, which has been imparted to the authenticity certification data 308, by using a prescribed decryption means to obtain a hash value 401.

In addition, the CPU obtains, from the authenticity certification data 308, the addresses and the sizes of all the authenticity certification subject areas within the image file 309, and it specifies the authenticity certification subject area combination 306 based on the addresses and the sizes that have been obtained. Furthermore, the CPU hashes the entire authenticity certification subject area combination 306 to obtain a hash value 402. Then, the CPU compares the obtained hash value 401 with the obtained hash value 402. At this time, if the hash value 401 and the hash value 402 match, it is certified that no data change has been performed to all the authenticity certification subject areas that constitute the authenticity certification subject area combination 306 since the image file 309 has been generated.

Figure 5:
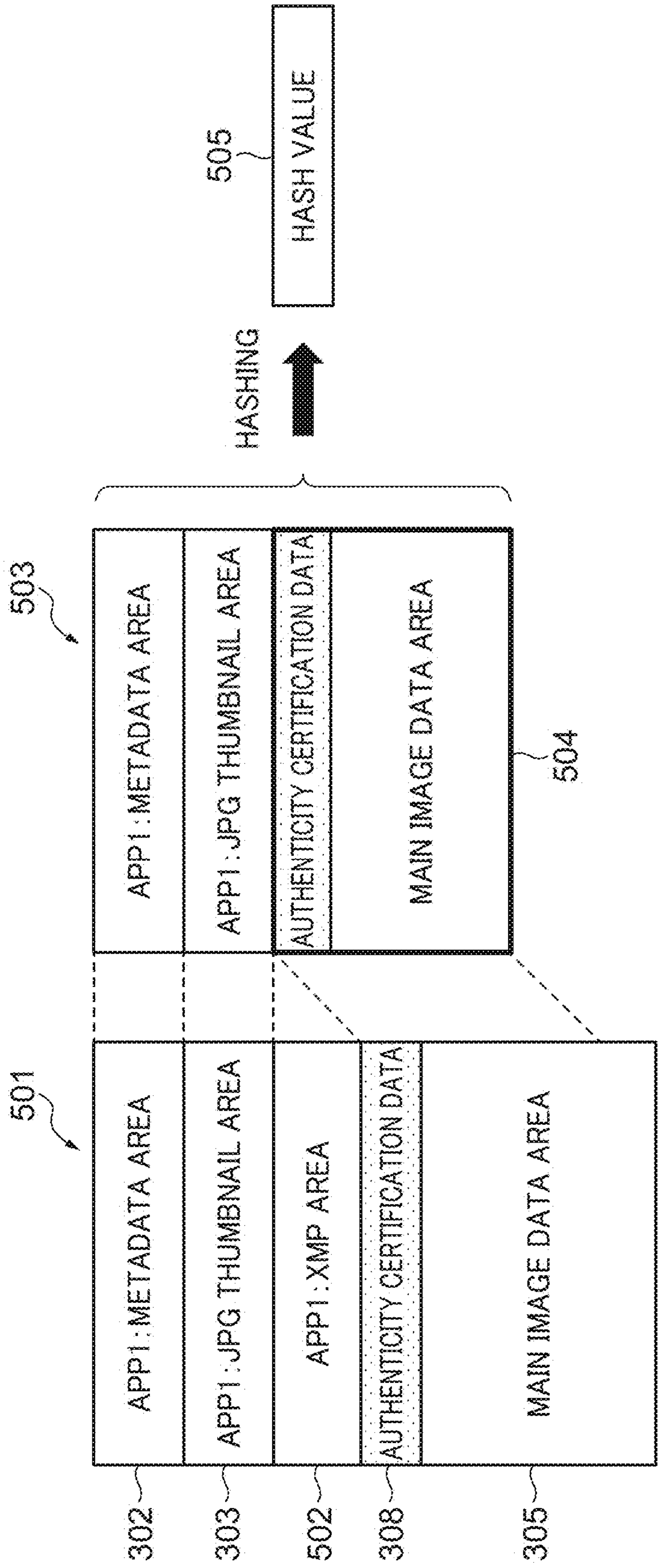
FIG. 5 is a diagram that shows a part of a procedure for certifying the authenticity of an image file in a case where appending data has been performed with respect to an XMP area that has been excluded from a subject of authenticity certification while the size of the XMP area is expanded after the image file is generated.

Hereinafter, authenticity certification of an image file in a case, in which due to the assumption that changing data will be performed, appending data has been performed with respect to an XMP area that has been excluded from the subject of authenticity certification while the size of the XMP area is expanded after the image file is generated, will be described with reference to FIG. 5. FIG. 5 is a diagram that shows a part of a procedure for certifying the authenticity of the image file in this case. It should be noted that, it is assumed that the procedure for certifying the authenticity of the image file, a part of which is shown in FIG. 5, is also realized by the CPU of the PC or the like executing application software or the like. A reference numeral 501 denotes an image file. The image file 501 has the same internal structure as the image file 309 that has been generated by photographing in the authenticity certification photographing mode. A reference numeral 502 denotes an XMP area in which data has been appended together with an increase in size after the image file 501 has been generated. Therefore, the size of the XMP area 502 is larger (has been enlarged) to a size larger than when the image file 501 has been generated. Here, the CPU obtains, from the authenticity certification data 308, addresses and sizes (hereinafter, referred to as "position information") of all authenticity certification subject areas within the image file 501.

However, the position information that has been obtained from the authenticity certification data 308 is position information when the image file 501 has been generated, that is, position information before the size of the XMP area 502 is enlarged. For this reason, an authenticity certification subject area combination 503, which has been specified by the position information that has been obtained from the authenticity certification data 308, includes, in an area indicated by a reference numeral 504, the authenticity certification data 308 that is not the subject of authenticity certification (that is, the authenticity certification data 308 that is not a subject of hashing). Therefore, even in the case where the CPU obtains a hash value 505 by hashing the entire authenticity certification subject area combination 503, since the hash value 505 does not match the hash value 401, it is not possible to certify the authenticity of the image file 501. In other words, even with respect to an area that has been excluded from the subject of authenticity certification, when appending data has been performed together with an increase in the size of the area after the image file has been generated, since the position of the area to be hashed at the time of authenticity certification will be shifted, the authenticity is not capable of being maintained.

Therefore, when generating the image file 501, it is conceivable to always increase (enlarge) the size of the XMP area 502 that has been excluded from the subject of authenticity certification, and to prepare an area increased by the increased (enlarged) size for appending data. However, after the image file 501 has been generated, appending data is not necessarily performed with respect to the XMP area 502 that has been excluded from the subject of authenticity certification. Therefore, when the size of the XMP area 502 that has been excluded from the subject of authenticity certification is always increased (enlarged), if appending data is not performed with respect to the XMP area 502, the image file 501 will contain an unnecessary area, resulting in an unnecessary increase in the size of the image file 501. The present invention has been made in consideration of dealing with such a case, and only in the case of being expected that appending data will be performed with respect to an area that has been excluded from the subject of authenticity certification, by pre-enlarging the size of the area, an image file is generated efficiently.

Figure 6:
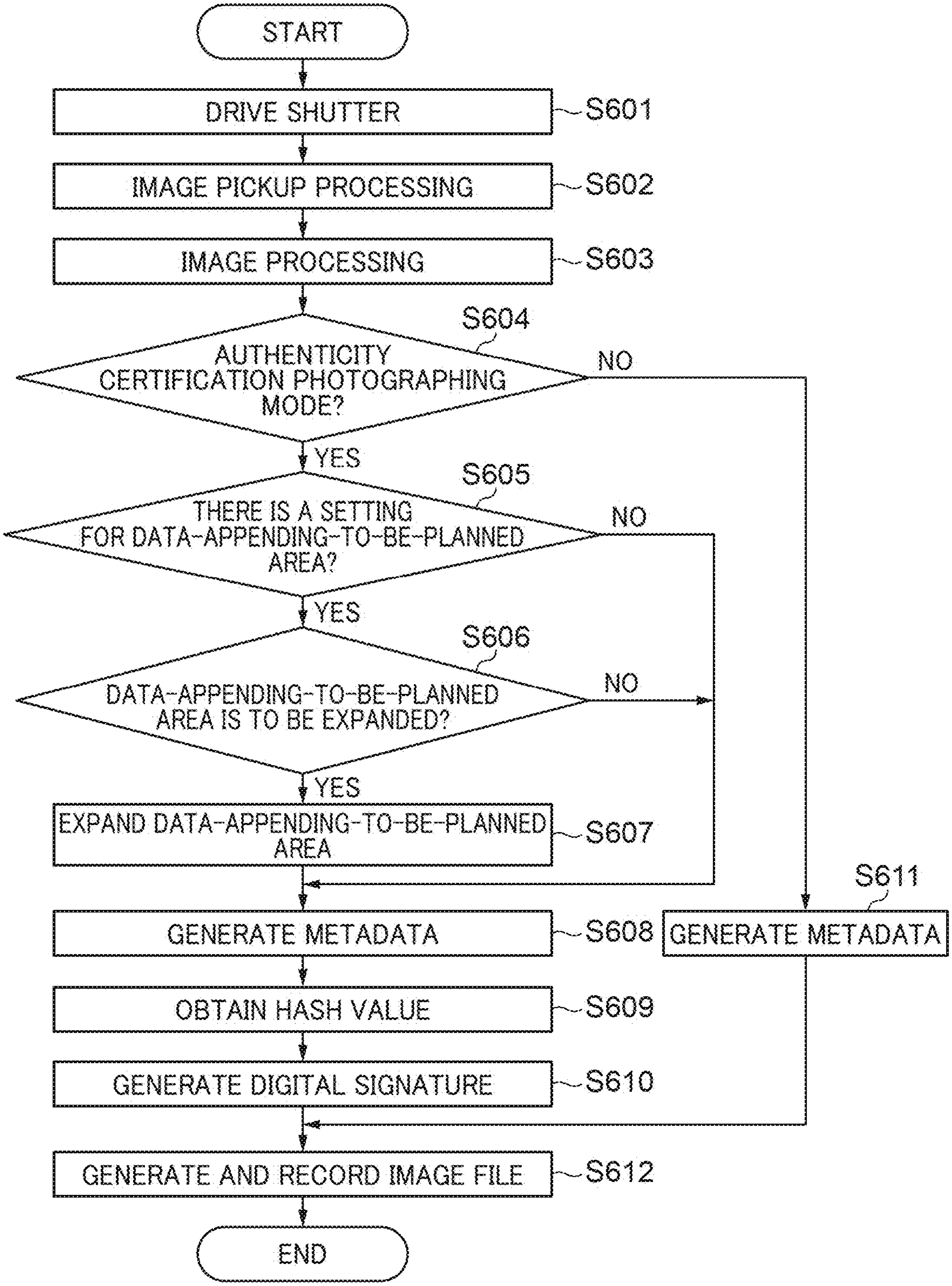
FIG. 6 is a flowchart that shows respective processes from photographing in the authenticity certification photographing mode or the like to generating an image file.

FIG. 6 is a flowchart that shows respective processes from photographing in the authenticity certification photographing mode or the like to generating an image file. The respective processes (a control method for the electronic apparatus) shown in the flowchart of FIG. 6 are realized by the system control unit 50 (a computer) loading the program recorded in the nonvolatile memory 56 into the memory 32 and executing it. The flowchart of FIG. 6 is started when the system control unit 50 has accepted a photographing start operation such as the user pressing the shutter button 61. In a step S601, in order to control the exposure time, the system control unit 50 causes driving of the shutter 101. In a step S602, the system control unit 50 performs an image pickup processing that converts the light from the subject received by the image pickup unit 22 into the electrical signals. In a step S603, the system control unit 50 performs an image processing such as development and encoding with respect to data that has been obtained by the image pickup processing described above. As a result, main image data and thumbnail image data are generated.

In a step S604, the system control unit 50 (a first determining unit) uses a setting value related to the authenticity certification photographing mode read out from the nonvolatile memory 56 to determine whether or not the digital camera 100 has been set to the authenticity certification photographing mode (a first determining step). In the case where the system control unit 50 determines that the digital camera 100 has been set to the authenticity certification photographing mode, the processing proceeds to a step S605. On the other hand, in the case where the system control unit 50 determines that the digital camera 100 has not been set to the authenticity certification photographing mode, the processing proceeds to a step S611 that will be described below.

In the step S605, the system control unit 50 (a second determining unit) reads out a setting value related to data appending from the nonvolatile memory 56, and uses the setting value that has been read out to determine whether or not there is a setting for an area where data appending is planned (a second determining step). In the case where the system control unit 50 determines that there is a setting for an area where data appending is planned (hereinafter, referred to as "a data-appending-to-be-planned area"), the processing proceeds to a step S606. On the other hand, in the case where the system control unit 50 determines that there is no setting for the data-appending-to-be-planned area, the processing proceeds to a step S608 that will be described below.

In the step S606, the system control unit 50 (a third determining unit) reads out the setting value related to data appending from the nonvolatile memory 56, and it uses the setting value that has been read out to determine whether or not to expand the data-appending-to-be-planned area. In the case where the system control unit 50 determines to expand the data-appending-to-be-planned area, the processing proceeds to a step S607. On the other hand, in the case where the system control unit 50 determines not to expand the data-appending-to-be-planned area, the processing proceeds to the step S608 that will be described below. It should be noted that as will be described below, the step S606 may be omitted. In the step S607, the system control unit 50 performs expansion of the data-appending-to-be-planned area. At this time, the system control unit 50 enlarges (increases) the size of the data-appending-to-be-planned area to a size larger than when the digital camera 100 has been set to the normal photographing mode (a mode different from the predetermined mode), and reserves an area for data appending.

In the step S608, the system control unit 50 generates metadata including attribute information (a photographer, a photographing time, a photographing location, a model of the digital camera 100, the setting values at the time of photographing, etc.) when the image pickup processing for generating the image has been performed. It should be noted that the system control unit 50 generates the metadata, which is to be stored in the data-appending-to-be-planned area, in a size smaller than the size of the data-appending-to-be-planned area that has been expanded in the step S607. In a step S609, the system control unit 50 hashes the metadata, which has been generated in the step S608 (excluding that stored in the data-appending-to-be-planned area), and the main image data and the thumbnail image data, which have been generated in the step S603, to obtain a hash value. In a step S610, the system control unit 50 encrypts the hash value that has been obtained in the step S609 by using a private key prepared in advance to generate a digital signature. In the step S611, the system control unit 50 generates metadata including the attribute information that has been described above.

In a step S612, the system control unit 50 (a generating unit) generates an image file by using the data and the like that have been processed and generated in the steps S601 to S611 (a generating step). In the case where the digital camera 100 has been set to the authenticity certification photographing mode, the system control unit 50 generates a digital image whose authenticity is capable of being certified (generates a digital image so that the authenticity certification is capable of being performed). At this time, the system control unit 50 may generate a digital image so that the authenticity certification thereof is capable of being performed in accordance with the C2PA standard, or it may generate a digital image so that the authenticity certification thereof is capable of being performed by using a procedure other than the C2PA standard. It should be noted that C2PA is an abbreviation for Coalition for Content Provenance and Authenticity. Furthermore, in the step S612, the system control unit 50 records the generated image file on the recording medium 200. Thereafter, the flowchart of FIG. 6 ends.

Figure 7A:
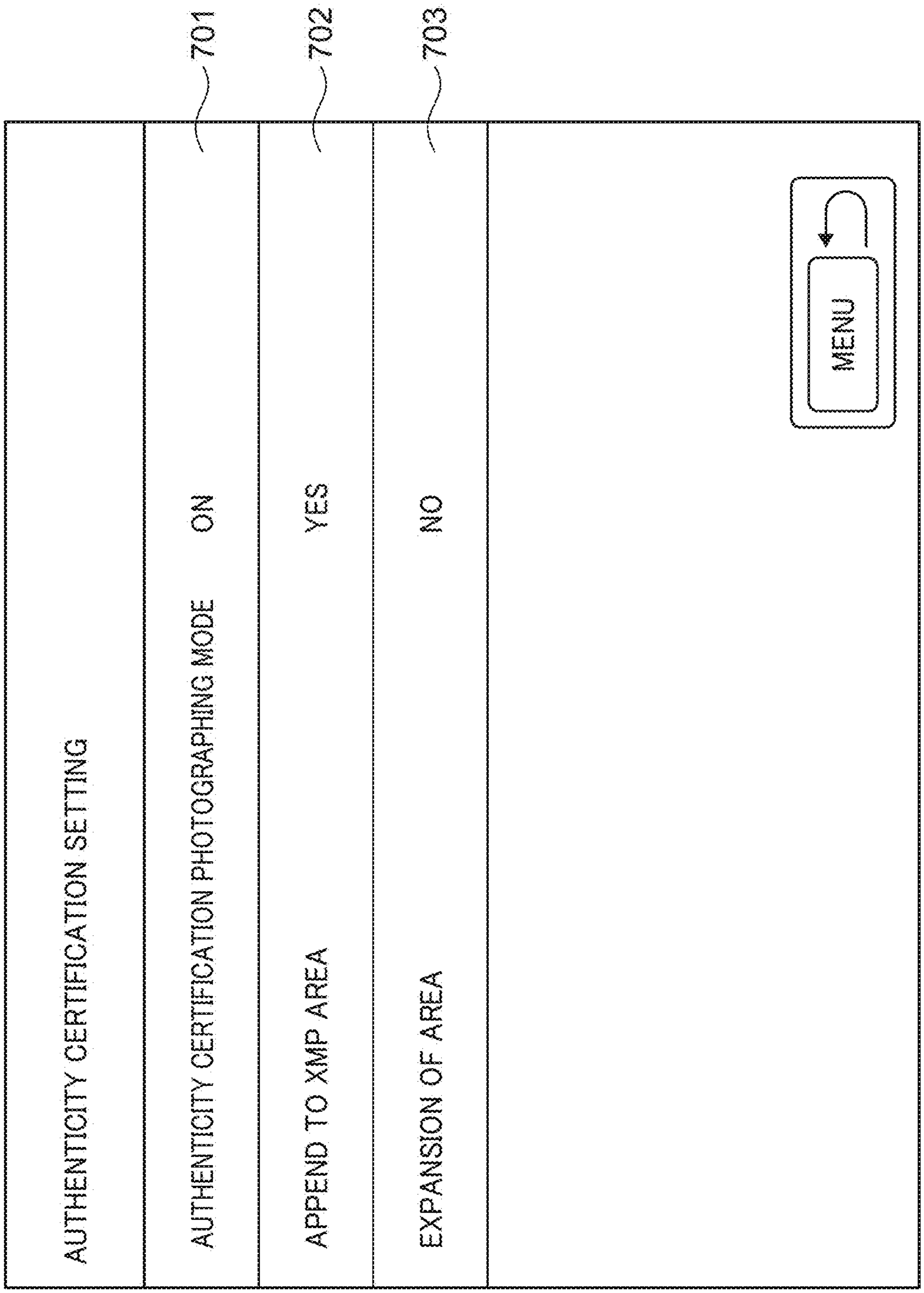
FIG. 7A and FIG. 7B are diagrams that show examples of setting screens relating to the authenticity certification photographing mode.
Figure 7B:
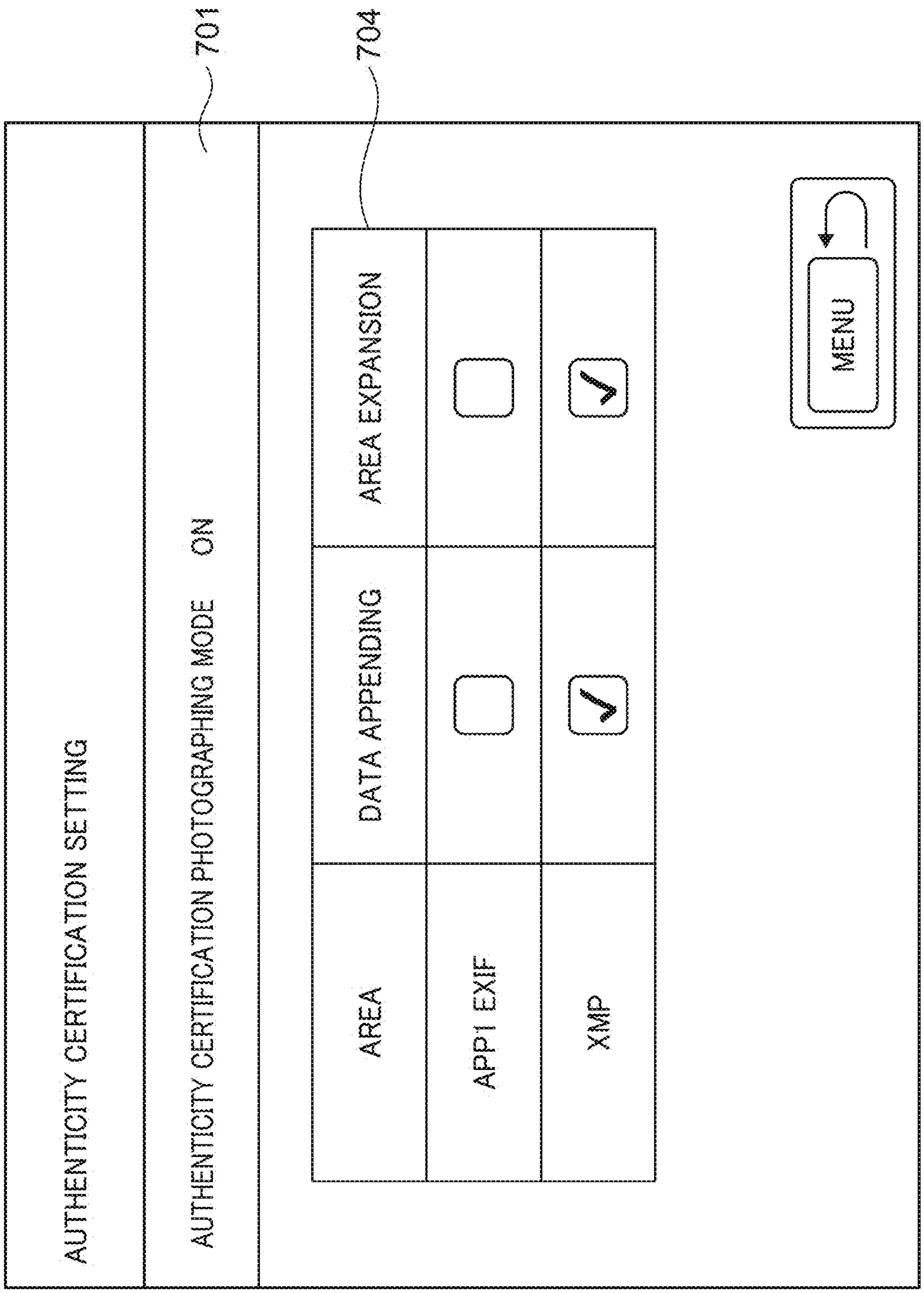

FIG. 7A and FIG. 7B are diagrams that show examples of setting screens relating to the authenticity certification photographing mode (hereinafter, simply referred to as "setting screens"). Each of the setting screens (user interface screens, i.e., UI screens), which are shown in FIG. 7A and FIG. 7B, is displayed on the display unit 28 by the system control unit 50. In the setting screen of FIG. 7A, a reference numeral 701 denotes an option for allowing the user to set, by an input via the touch panel 70*a*, whether or not to set the digital camera 100 to the authenticity certification photographing mode. In the case where the user has set the option 701 to "ON", the system control unit 50 records, in the nonvolatile memory 56, a setting value that indicates setting the digital camera 100 to the authenticity certification photographing mode. Therefore, in this case, the system control unit 50 determines in the step S604 that the digital camera 100 has been set to the authenticity certification photographing mode. On the other hand, in the case where the user has set the option 701 to "OFF", the system control unit 50 records, in the nonvolatile memory 56, a setting value that indicates setting the digital camera 100 to a mode different from the authenticity certification photographing mode (for example, the normal photographing mode). Therefore, in this case, the system control unit 50 determines in the step S604 that the digital camera 100 has not been set to the authenticity certification photographing mode.

A reference numeral 702 denotes an option for allowing the user to set, by an input via the touch panel 70*a*, whether or not data appending is planned to be performed with respect to an XMP area of an image file generated by photographing in the authenticity certification photographing mode after the image file has been generated. In the case where the user has set the option 702 to "YES", the system control unit 50 (an append setting unit) records, in the nonvolatile memory 56, a setting value indicating that data appending is planned to be performed with respect to the XMP area of the image file generated by photographing in the authenticity certification photographing mode after the image file has been generated. It should be noted that in the case where the setting screen of FIG. 7A is displayed on the display unit 28, the area, in which the data-appending-to-be-planned area of the step S605 is capable of being set, is only the XMP area. Therefore, in this case, the system control unit 50 determines in the step S605 that there is the setting for the data-appending-to-be-planned area (the data-appending-to-be-planned area is to be set). On the other hand, in the case where the user has set the option 702 to "NO", the system control unit 50 records, in the nonvolatile memory 56, a setting value indicating that data appending is not planned to be performed with respect to the XMP area of the image file generated by photographing in the authenticity certification photographing mode after the image file has been generated. Therefore, in this case, the system control unit 50 determines in the step S605 that there is no setting for the data-appending-to-be-planned area (the data-appending-to-be-planned area is not to be set). As described above, in the present embodiment, the data-appending-to-be-planned area refers to an area from among areas constituting the image file generated by photographing in the authenticity certification photographing mode, in which data appending is planned to be performed after the image file has been generated.

A reference numeral 703 denotes an option for allowing the user to set, by an input via the touch panel 70*a*, whether or not to, in the case where the option 702 has been set to "YES", enlarge the size of the XMP area of the image file generated by photographing in the authenticity certification photographing mode. In the case where the user has set the option 703 to "YES", the system control unit 50 (an enlargement setting unit) records, in the nonvolatile memory 56, a setting value that indicates enlarging the size of the XMP area of the image file generated by photographing in the authenticity certification photographing mode. Therefore, in this case, the system control unit 50 determines in the step S606 to expand the data-appending-to-be-planned area. Furthermore, in the step S607, the system control unit 50 enlarges (increases) the size of the data-appending-to-be-planned area, that is, the size of the XMP area of the image file generated by photographing in the authenticity certification photographing mode, to a size larger than when the digital camera 100 has been set to the normal photographing mode.

On the other hand, in the case where the user has set the option 703 to "NO", the system control unit 50 records, in the nonvolatile memory 56, a setting value that indicates not enlarging the size of the XMP area of the image file generated by photographing in the authenticity certification photographing mode. Therefore, in this case, since the system control unit 50 determines in the step S606 not to expand the data-appending-to-be-planned area, the system control unit 50 does not perform the process of the step S607. Therefore, the size of the data-appending-to-be-planned area, that is, the size of the XMP area of the image file generated by photographing in the authenticity certification photographing mode, is the same as the size when the digital camera 100 has been set to the normal photographing mode.

As described above, in the case where the option 701 has been set to "ON", the option 702 has been set to "YES", and the option 703 has been set to "YES", the system control unit 50 generates the image file 309 by enlarging the size of the XMP area 304 than when the digital camera 100 has been set to the normal photographing mode. In other words, the system control unit 50 refers to the user's settings on the setting screen of FIG. 7A, and only in the case of being expected that appending data will be performed with respect to the XMP area 304 after the image file 309 has been generated, enlarges the size of the XMP area 304 to reserve an area where data is to be appended. As a result, the generation of the image file 309 by photographing in the authenticity certification photographing mode is efficiently performed. In this way, the digital camera 100 is able to suppress an unnecessary increase in the size of the image file 309 whose authenticity is capable of being certified even if the data is changed after generation.

It should be noted that in the case where the image file 309 has been generated so that the authenticity certification thereof is capable of being performed in accordance with the C2PA standard, data appending is capable of being performed with respect to the image file 309 that has been generated in compliance with the C2PA standard after the image file 309 has been generated. In addition, for an image file that does not comply with the C2PA standard, such as the image file 301 that has been generated by photographing in the normal photographing mode, the size of the image file does not increase unnecessarily.

In addition, as described above, in the case where the option 703 has been set to "NO", the size of the XMP area 304 of the image file 309 that has been generated by photographing in the authenticity certification photographing mode is the same as the size when the digital camera 100 has been set to the normal photographing mode. Therefore, in the case where the user plans to perform a data replacement or the like, which does not require an increase in size (which does not need to enlarge the size), with respect to the XMP area 304 after the image file 309 has been generated, the user just sets the option 703 to "NO". On the other hand, in the case where a data replacement or the like, which does not require an increase in size (which does not need to enlarge the size), is not planned to be performed with respect to the XMP area 304 after the image file 309 has been generated, the option 703 and the step S606 may be omitted.

In addition, in the case where it is possible to set a plurality of data-appending-to-be-planned areas in one image file generated by photographing in the authenticity certification photographing mode, the system control unit 50 causes the display unit 28 to display, for example, the setting screen of FIG. 7B. On the setting screen of FIG. 7B, the user is able to check or uncheck each check box in a checklist 704 by inputting via the touch panel 70*a*. In the case where the setting screen of FIG. 7B is displayed on the display unit 28, as the area, in which the data-appending-to-be-planned area is capable of being set, an APP1 EXIF area and an XMP area are provided. It should be noted that the area, in which the data-appending-to-be-planned area is capable of being set, refers to an area from among areas constituting the image file generated by photographing in the authenticity certification photographing mode, in which changing data is permitted after the image file has been generated. Therefore, in the following description, the area, in which the data-appending-to-be-planned area is capable of being set, will be referred to as "a data change permitted area". It should be noted that the data change permitted area is also an area that has been excluded from the subject of authenticity certification.

In each check box of the checklist 704, the user is able to individually set data appending corresponding to the option 702 and area expansion corresponding to the option 703 for the APP1 EXIF area and the XMP area. As a result, the system control unit 50 (the append setting unit) records, in the nonvolatile memory 56, setting values regarding the plan for appending data and the expansion of the size of the area for each of the APP1 EXIF area and the XMP area, depending on whether or not a check is made in the checklist 704.

The system control unit 50 further stores, as metadata, information, which is capable of identifying the check contents in the checklist 704, within the image file generated by photographing in the authenticity certification photographing mode. Using this information, the CPU of the PC or the like, which runs application software or the like for performing data change with respect to an image file, is able to determine which areas are the data-appending-to-be-planned areas, and further, which data-appending-to-be-planned area has been expanded in size. This enables the data append processing to be executed appropriately.

It should be noted that the user may use any one of the operation members (excluding the touch panel 70*a*) included in the operation unit 70 to perform a setting for at least one of the three options 701, 702, and 703 on the setting screen of FIG. 7A. Similarly, the user may use any one of the operation members (excluding the touch panel 70*a*) included in the operation unit 70 to perform a setting for at least one of the four check boxes in the checklist 704 on the setting screen of FIG. 7B.

Although the preferred embodiment of the present invention has been described above, the present invention is not limited to the above-described embodiment, and various modifications and changes are possible within the scope of the gist of the present invention. For example, in the case where the user has set the option 703 to "YES" on the setting screen of FIG. 7A, the user may be able to set the size of the XMP area. In this case, the size of the XMP area may be set in units of KB or the like, or may be set by using options such as large, medium, and small. In addition, the area size after enlargement may be set, or the size of the enlarged area may be set. In addition, for the XMP area in which the setting value that indicates enlarging the size of the XMP area has been recorded in the nonvolatile memory 56, the system control unit 50 (a second size setting unit) further records, in the nonvolatile memory 56, a value indicating the size that has been set by the user.

It should be noted that in the case where the option 703 has been omitted, when the user has set the option 702 to "YES", the user may be able to set the size of the XMP area. In this case, for the XMP area in which the setting value indicating that data appending is planned to be performed has been recorded in the nonvolatile memory 56, the system control unit 50 (a first size setting unit) further records, in the nonvolatile memory 56, a value indicating the size that has been set by the user. In this way, the user is able to appropriately set the size of the XMP area, with respect to which the user plans to append data. Therefore, in the case where data appending has been performed with respect to an image file that has been generated by photographing in the authenticity certification photographing mode, it is possible to prevent a case where the size of the expanded XMP area is insufficient or a case where the size of the XMP area is reserved in excess of the size of the appended data. This also applies to the setting screen of FIG. 7B.

In addition, the system control unit 50 (a display unit) may display a viewing screen of image files on the display unit 28, and display, on the viewing screen, information capable of identifying whether or not the expansion of the size of the data change permitted area has been performed. As a result, the user is able to identify that the expansion of the size of the data change permitted area of which image file from among the image files that have been generated by photographing has been performed and whether or not data appending is capable of being performed.

In addition, although different from the present embodiment, when an image file is generated in a format other than EXIF format (another format), depending on the another format, in the image file, all authenticity certification subject areas may be located before an area that has been excluded from the subject of authenticity certification. In this case, even if the size of the area that has been excluded from the subject of authenticity certification is expanded, the positions of all authenticity certification subject areas, that is, the positions of the areas to be hashed at the time of authenticity certification, will not shift. Therefore, in this case, the expansion of the size of the area may not be performed in the step S606.

In addition, the electronic apparatus according to the present invention is not limited to the digital camera 100 that has been described in the present embodiment. The present invention is capable of being applied to electronic apparatuses that generate digital files whose authenticity is capable of being certified. In addition to digital cameras, such electronic apparatuses include, for example, PCs, personal digital assistants (PDAs), tablet terminals, smartphones, mobile phones, digital photo frames, music players, game consoles, and electronic book readers. In addition, the digital file whose authenticity is capable of being certified is not limited to the image file that has been described in the present embodiment, but may be any digital content file (for example, a PDF file or the like).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-103936, filed on Jun. 27, 2024, which is hereby incorporated by reference herein in its entirety.

What is claimed is:

1. An electronic apparatus that has a predetermined mode in which a digital file whose authenticity is capable of being certified is generated, the electronic apparatus comprising:

at least one processor; and a memory coupled to the processor storing instructions that, when executed by the processor, cause the processor to function as:

a first determining unit that determines whether or not the electronic apparatus has been set to the predetermined mode;

a second determining unit that determines whether or not a plan, in which data appending is performed with respect to a predetermined area, which has been excluded from a subject of authenticity certification, from among areas constituting the digital file after the digital file is generated, has been set; and a generating unit that, in a case where the electronic apparatus has been set to the predetermined mode and the plan, in which data appending is performed with respect to the predetermined area after the digital file is generated, has been set, enlarges a size of the predetermined area to a size larger than when the electronic apparatus has been set to a mode different from the predetermined mode and generates the digital file.

2. The electronic apparatus according to claim 1, wherein the processor is caused to further function as an append setting unit that sets whether or not there is the plan, in which data appending is performed with respect to the predetermined area after the digital file is generated, in response to a user's input.

3. The electronic apparatus according to claim 2, wherein the append setting unit, in a case where the digital file has a plurality of the predetermined areas, sets whether or not there is the plan, in which data appending is performed after the digital file is generated, for each of the plurality of the predetermined areas in response to a user's input.

4. The electronic apparatus according to claim 2, wherein the processor is caused to further function as a first size setting unit that sets the size of the predetermined area that has been set to have the plan, in which data appending is performed after the digital file is generated, by the append setting unit in response to a user's input.

5. The electronic apparatus according to claim 4, wherein at least one of the append setting unit and the first size setting unit obtains the user's input from a UI screen.

6. The electronic apparatus according to claim 1, wherein the processor is caused to further function as a third determining unit that determines whether or not enlarging the size of the predetermined area has been set, and the generating unit, in a case where the electronic apparatus has been set to the predetermined mode, the plan, in which data appending is performed with respect to the predetermined area after the digital file is generated, has been set, and enlarging the size of the predetermined area has been set, enlarges the size of the predetermined area to a size larger than when the electronic apparatus has been set to the mode different from the predetermined mode and generates the digital file.

7. The electronic apparatus according to claim 6, wherein the processor is caused to further function as an append setting unit that sets whether or not there is the plan, in which data appending is performed with respect to the predetermined area after the digital file is generated, in response to a user's input.

8. The electronic apparatus according to claim 7, wherein the append setting unit, in a case where the digital file has a plurality of the predetermined areas, sets whether or not there is the plan, in which data appending is performed after the digital file is generated, for each of the plurality of the predetermined areas in response to a user's input.

9. The electronic apparatus according to claim 7, wherein the processor is caused to further function as an enlargement setting unit that sets whether or not to enlarge the size of the predetermined area that has been set to have the plan, in which data appending is performed after the digital file is generated, by the append setting unit in response to a user's input.

10. The electronic apparatus according to claim 9, wherein the processor is caused to further function as a second size setting unit that sets the size of the predetermined area, for which enlarging the size of the predetermined area has been set by the enlargement setting unit, in response to a user's input.

11. The electronic apparatus according to claim 10, wherein at least one of the append setting unit, the enlargement setting unit, and the second size setting unit obtains the user's input from a UI screen.

12. The electronic apparatus according to claim 1, wherein the generating unit, in a case where the digital file has a plurality of the predetermined areas, stores, in the digital file, information for identifying the predetermined area that has been set to have the plan, in which data appending is performed after the digital file is generated, or information for identifying the predetermined area whose size has been enlarged when the digital file is generated.

13. The electronic apparatus according to claim 1, wherein the processor is caused to further function as a display unit that displays, on a viewing screen of the digital file, information indicating whether or not the size of the predetermined area has been enlarged.

14. The electronic apparatus according to claim 1, wherein the generating unit generates the digital file so that authenticity certification of the digital file is capable of being performed in accordance with the Coalition for Content Provenance and Authenticity (C2PA) standard.

15. The electronic apparatus according to claim 1, wherein the generating unit, in a case where all areas in the digital file that are the subject of authenticity certification are located before the predetermined area, generates the digital file without enlarging the size of the predetermined area.

16. The electronic apparatus according to claim 1, wherein the generating unit generates an image file in EXIF format as the digital file.

17. The electronic apparatus according to claim 16, wherein the electronic apparatus is a digital camera.

18. A control method for an electronic apparatus that has a predetermined mode in which a digital file whose authenticity is capable of being certified is generated, the control method comprising:

a first determining step of determining whether or not the electronic apparatus has been set to the predetermined mode;

a second determining step of determining whether or not a plan, in which data appending is performed with respect to a predetermined area, which has been excluded from a subject of authenticity certification, from among areas constituting the digital file after the digital file is generated, has been set; and a generating step of, in a case where the electronic apparatus has been set to the predetermined mode and the plan, in which data appending is performed with respect to the predetermined area after the digital file is generated, has been set, enlarging a size of the predetermined area to a size larger than when the electronic apparatus has been set to a mode different from the predetermined mode and generating the digital file.

19. A non-transitory computer-readable storage medium storing a program for causing a computer to execute a control method for an electronic apparatus that has a predetermined mode in which a digital file whose authenticity is capable of being certified is generated, the control method comprising:

a first determining step of determining whether or not the electronic apparatus has been set to the predetermined mode;

a second determining step of determining whether or not a plan, in which data appending is performed with respect to a predetermined area, which has been excluded from a subject of authenticity certification, from among areas constituting the digital file after the digital file is generated, has been set; and a generating step of, in a case where the electronic apparatus has been set to the predetermined mode and the plan, in which data appending is performed with respect to the predetermined area after the digital file is generated, has been set, enlarging a size of the predetermined area to a size larger than when the electronic apparatus has been set to a mode different from the predetermined mode and generating the digital file.

* * * * *